United States Patent [19]

Dassler et al.

[11] Patent Number: 4,736,312
[45] Date of Patent: Apr. 5, 1988

[54] ARRANGEMENT FOR THE DETERMINATION OF MOVEMENT SEQUENCES IN RUNNING DISCIPLINES

[75] Inventors: Armin A. Dassler, Herzogenaurach; Gerhard Pirner, Nuremberg; Heinz Gerhaeuser, Erlangen, all of Fed. Rep. of Germany

[73] Assignee: Puma AG Rudolf Dassler Sport, Herzogenaurach, Fed. Rep. of Germany

[21] Appl. No.: 812,524

[22] Filed: Dec. 23, 1985

[30] Foreign Application Priority Data

Feb. 18, 1985 [DE] Fed. Rep. of Germany ....... 3505521

[51] Int. Cl.⁴ .................. G01C 22/00; G08C 15/00; H04B 1/34; A63B 5/00
[52] U.S. Cl. .................................. 364/561; 342/118; 340/870.15; 340/323 R; 455/100; 272/100; 235/105
[58] Field of Search ............... 364/410, 411, 561, 562, 364/709; 235/105 R; 340/323 R; 272/69, 70, 100; 455/100; 342/42, 118; 367/89, 99; 340/870.11, 870.15

[56] References Cited

U.S. PATENT DOCUMENTS

| 4,371,945 | 2/1983 | Karr et al. | 364/561 |
| 4,571,680 | 2/1986 | Wu | 235/105 X |
| 4,578,769 | 3/1986 | Frederick | 364/561 X |
| 4,630,226 | 12/1986 | Tanaka | 364/561 |

Primary Examiner—Parshotam S. Lall
Assistant Examiner—Joseph L. Dixon
Attorney, Agent, or Firm—Sixbey, Friedman & Leedom

[57] ABSTRACT

A system with pressure sensors (5, 12), transmitters (8, 16, 18) and receivers (10, 21) provided in running shoes (2, 3) that upon the shoes (2, 3) leaving or contacting the ground (14) emit and/or receive respective signals (S1, S2, S3, S4). Signals (S1, S2, S4) are formed which are received by a receiver (21) that is independent of the shoes and which are evaluated in an evaluation unit (23). The distance between the feet (FA) is determined from when a front striding foot hits the ground and the rear foot lifts off based upon the timing between the signals using an approximating formula. From the times and the stride length other values movement characteristics of the user may be determined as well.

20 Claims, 2 Drawing Sheets

ARRANGEMENT FOR THE DETERMINATION OF MOVEMENT SEQUENCES IN RUNNING DISCIPLINES

BACKGROUND AND SUMMARY OF THE INVENTION

The present invention relates to a system for the determination of the movement sequences in running disciplines with shoes having a ground contact or pressure sensor means, especially athletic shoes having a computer means for processing data as a function of the sensor means.

In co-pending U.S. application Ser. No. 701,194, filed Feb. 13, 1985, now U.S. Pat. No. 4,703,445, of the present assignee, a sport shoe for running disciplines and a process for providing information and/or for the exchange of information concerning moving sequences in running disciplines has been described which, among other things, permit measurement of the speed of running, the stride length and the distance covered.

With the present invention, the primary object is that of developing the concepts of the initial application in such a way that it will be possible to measure, with as great as possible precision, the actual stride length independently of the speed of running and with due consideration of a possible flight phase wherein both of the runner's feet leave the ground.

This object is achieved, in accordance with a preferred embodiment of the invention by providing a system for the determination of movement characteristics in running disciplines, such as stride length, running speed or the like, with shoes, especially athletic shoes, comprising first and second shoes; first sensor means, in said first shoe, for responding to lifting off of the first shoe from the ground; second sensor means, in said second shoe, for responding to contacting of the second shoe with the ground; first transmitting means, in said first shoe for radiating a first signal, said first transmitter means being triggerable by a response from the first sensor means; second transmitter means, in said second shoe, for radiating second and third signals, said second transmitter means being triggerable as a result of a response from the second sensor means; first receiver means, in said first shoe, for receiving the third signal and operable for causing said first transmitter means to radiate a fourth signal in response to receipt of said third signal; and an evaluating arrangement that is operable for determining the movement characteristics of a user wearing the shoes based upon the first, second and fourth signals according to their time and origin; and second receiver means, positionally spaced from said shoes, and operable for receiving the first, second and fourth signals, differentiating these signals and, after differentiation, feeding these signals to said evaluating arrangement.

The invention makes it possible to measure extremely precisely, with relatively little expenditure, the actual stride length between the foot being lifted and the foot being put down and on the basis of these measured values to determine, for example, the distance covered by running.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
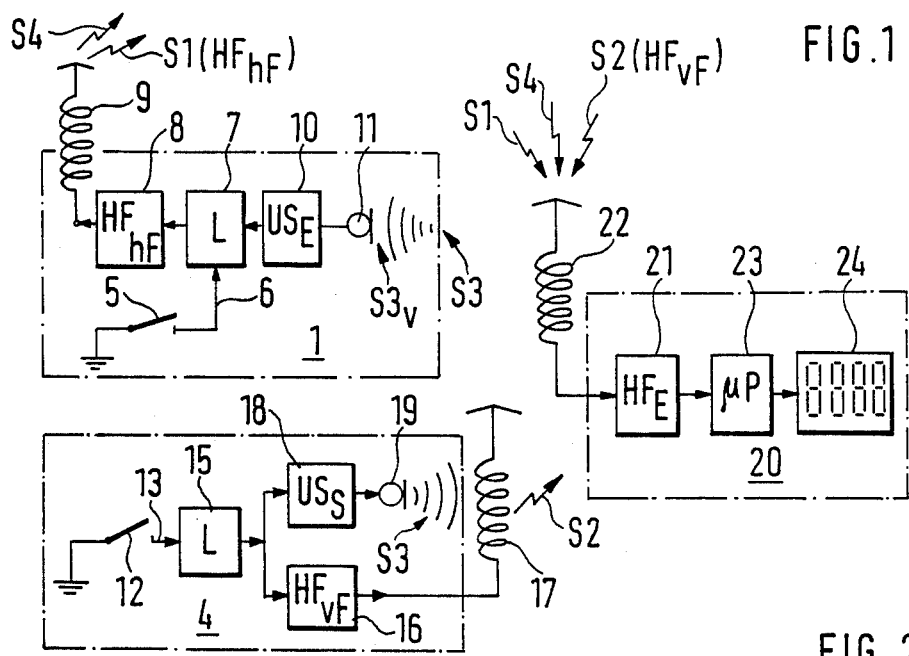
FIG. 1 shows a diagram of a system according to a preferred embodiment of the invention.

In FIG. 1, numeral 1 designates, as a whole, a first arrangement which is provided in a first shoe 2 (FIG. 2) that, in the following explanation, is the shoe of the trailing foot. In the other shoe 3 (FIG. 2), a second arrangement 4 has been provided which, for purposes of this explanation, is the forward foot.

The first arrangement 1 contains a first sensor means comprised of a ground contact or pressure sensor 5, which may be in the form of a switching contact. This pressure sensor 5 is attached in the shoe 2 in such a way that it closes or opens a circuit upon lifting off of the shoe sole, particularly the toe of the shoe 2 from the ground. A conductor 6 conveys a sensor signal from the pressure sensor 5 to a logic circuit 7, which processes an impulse from the sensor signal that is fed to a first transmitter means 8, from which it is issued, preferably, in a modulated form as a first signal S1.

In the embodiment, by way of example, the first transmitter means 8 is a high frequency transmitter $HF_{hF}$, which radiates the modulated impulse signal S1, for example, in digital form, by way of a suitable antenna 9.

Furthermore, the first arrangement 1 contains a first receiver means 10 for acoustic and/or electromagnetic waves. In the example, the receiver 10 is developed as an ultrasound receiver $US_E$, with an associated sensor 11, in this case an ultrasound converter, for example, a type of microphone capsule, a piezo-transformer or the like. From the first receiver means 10, a received third signal S3 (which will be explained later) reaches the logic circuit 7, which forms a receiving impulse of a certain duration of time, for example 50 $\mu$s to 1000 $\mu$s, especially 200 $\mu$s to 400 $\mu$s, from signal S3. This receiving impulse is fed to transmitter $HF_{hF}$ of the first transmitter means 8 (or to an another transmitter of the first transmitter means that is provided in the shoe 2) and is radiated from said transmitter in the form of a fourth signal S4, especially in the form of a modulated signal. The individual components 7, 8, 10, possibly also 5 and 9, may be combined into a constructional unit and, thus, may be housed in the shoe 2 as a compact element.

The second arrangement 4 contains a second pressure sensor means formed of a sensor 12 of the same or similar construction to the pressure sensor 5 of the first sensor means. Upon striking of the shoe 3, particularly the heel of the shoe, containing the arrangement 4 against the ground 14 (FIG. 2), a voltage is turned on or off by way of a line 13 to a logic circuit 15. As a result, the logic circuit 15 forms a control impulse which is conducted to a transmitter 16 of a second transmitter means, which in this case is likewise developed as a high frequency transmitter $HF_{vF}$, and is radiated from this transmitter 16, by way of a suitable coupling member, for example, an antenna 17, as a second signal S2 in a specially modulated form. Moreover, the control impulse is radiated by way of an additional transmitter 18 of the second transmitter means, via an associated uncoupling element 19, as a third signal S3. In the present case, the additional transmitter 18 is an ultrasound transmitter $US_S$ and the uncoupling element 19 is an ultrasound producer, for example, some kind of microphone capsule, a piezo-element or the like. The third signal S3 therefore is an ultrasound signal.

At this point it is noted that specifics of the logic circuits 7, 15 and their respective interface circuitry with respect to the other components of arrangements 1 and 4 form no part of the present invention since they, per se, merely represent conventional expedients for producing the abovedescribed types of functions and operations and that will be recognized as such by those of ordinary skill in the art. Thus, by way of example only, it is noted that among these well known, commercially available, integrated circuits suitable for use as impulse forming logic circuits 7 and 15 are the type CD 4538 of RCA, the Valvo type HEF 4538 and the Motorola type MC 1 4538.

The ultrasound signal S3 is received initially by the ultrasound sensor 11 in the arrangement 1 and is radiated by way of the first transmitter means 8 as a fourth signal S4. Since the two shoes 2 and 3 have a foot distance FA corresponding to the respective positions of the feet hF and vF at the moment when the forward shoe is put down, the third signal S3 requires a running time LZ corresponding to the foot distance. Thus, the fourth signal S4, too, is delayed by this running time vis-a-vis the third signal S3. Therefore, the precise foot distance FA may be determined from the speed of sound and the running time at the time when the forward foot vF strikes the ground 14, since $FA = v_{air} \cdot t_{LZ}$, whenever $v_{air}$ is the speed of sound in air and $t_{LZ}$ is the above mentioned running time.

Figure 2:
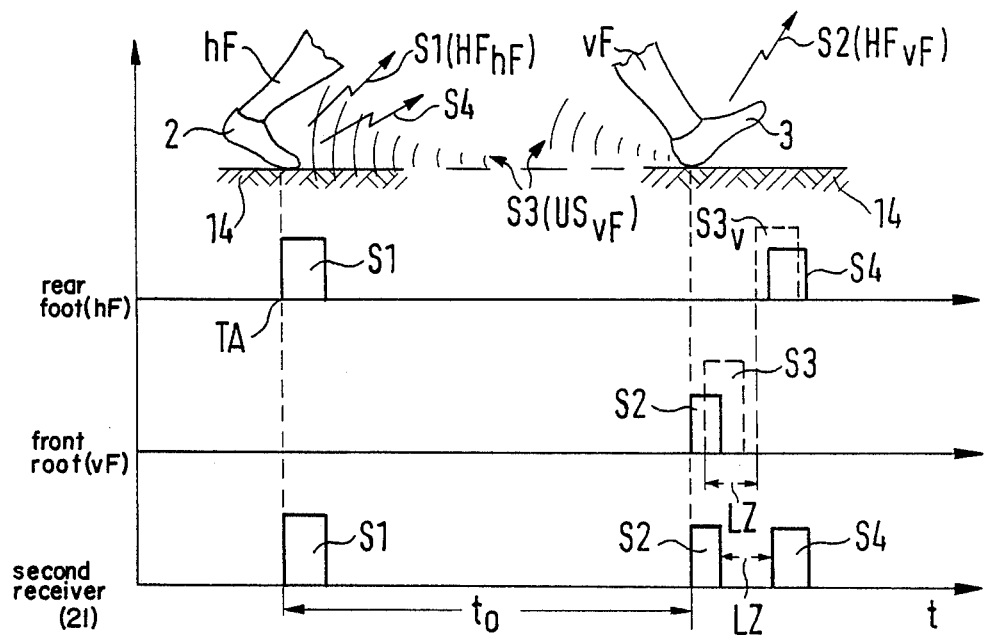
FIG. 2 shows an impulse diagram of the signals issuing from or received by the individual shoes as well as an impulse diagram of the signals received by the second receiver.
Figure 3:
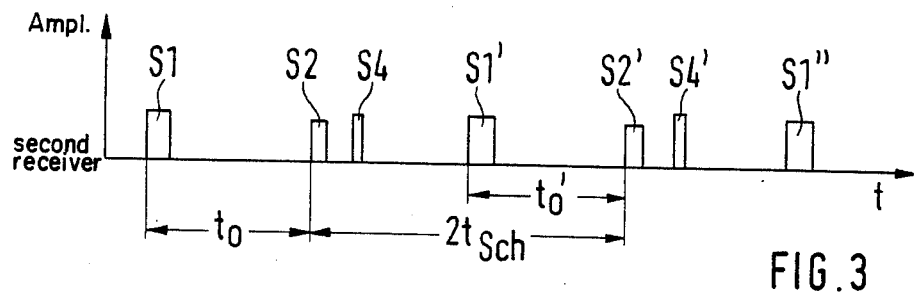
FIG. 3 shows an impulse diagram of the second receiver over a time period of two steps.
Figure 4:
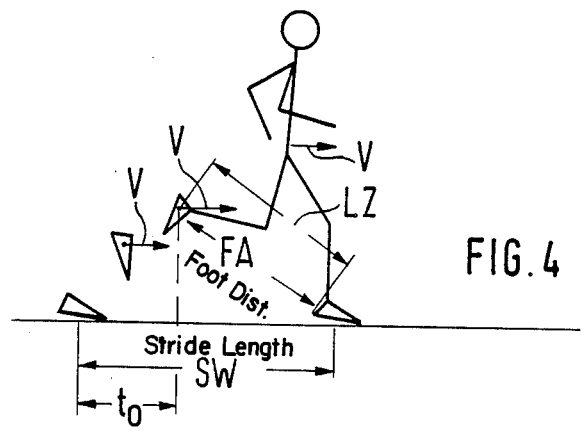
FIG. 4 shows a phase of movement of a runner and FIG. 5 shows an athletic shoe, partially in cross section and developed for the system according to FIG. 1.

In order to receive the signals S1, S2, and S4 and in order to be able to determine from these signals the desired data, a third arrangement 20 with a second receiver 21 is provided as part of the system, which arrangement may be carried by the runner, e.g., in his hand or in/on his clothing. The receiver 21 is in a position to receive the signals S1, S2, S4 by way of an antenna 22 and is capable of processing them. In the present case, this is a high frequency receiver $HF_E$ which demodulates the modulated signals S1, S2, S4 and feeds the impulses obtained to a time measuring device which, in this case, is integrated into an associated microcomputer 23 serving as an evaluating unit. The microcomputer 23 contains at least a programmable storage and a computing unit. From the transient distance of the individual signals which are shown, for the trailing foot hF, for the forward foot vF and for the second receiver 21, in the form of an impulse diagram in FIG. 2, the microprocessor will be capable of calculating the length of the step being taken as well as from it the distance covered and the instantaneous or average speed. This is accomplished approximately as follows:

In the diagram of the FIG. 2, the signal S1 is produced, as described, when the toe portion of the shoe 2 of the trailing foot hF is lifted up (while the system will operate based upon a signal produced by ground contact of the toe portion, such is undesirable since it will introduce a significant error into the stride length calculation). Since it is an HF signal in the illustrated example, it is also designated by $HF_{hF}$. After some time, which will be called the jump time, $t_0$, the forward shoe 3 meets the ground 1 and delivers the signals S2 (in the case of HF signal $HF_{vF}$) and S3 (designated as ultrasound signal $US_{vF}$ of the ultrasound transmitter 18) simultaneously or at least approximately simultaneously. The latter signal S3 is received, delayed by the running time LZ, as a delayed third signal S3 and as a result, the fourth signal S4 is radiated from the first transmitter 8 in the shoe 2 of the trailing foot hF.

The second receiver 21 receives the first signal S1, therefore, at the initial point in time TA, after the jump time $t_0$ it receives the second signal S2 and after the running time LZ the fourth signal S4. Subsequently, a first signal S1' comes again after some time, then a second signal S2' follows after an additional jump time $t_0'$. The transient distance between two successive second signals S2 and S2' corresponds to the time of two steps and in this case has been designated by $2t_{Sch}$. In this regard, it is noted that relative locations and orientations required for receipt of the transmitted signals S1–S4 occurs only when shoe 2 is the rear foot shoe, as illustrated, unless each shoe is provided with an arrangement 1 and an arrangement 4, in which case calculation may be made for each stride instead of every other one. However, such a modification would be more costly and the use of only an arrangement 1 in one shoe and only an arrangement 4 in the other provides sufficient accuracy.

The calculation of the pertinent stride length SW starts out from the following consideration:

Exhaustive studies of the movement sequences of the legs during running with a jump phase, i.e., in the case of a type of running where a lifting of the trailing foot from the ground 14 takes place prior to the forward foot having reached the ground 14, have determined that, during this jump phase, the trailing foot has practically the same component of speed v in the running direction as has the body of the runner. This speed component may be defined as the stride length SW per stepping time $t_{Sch}$, therefore:

$$V = (SW/t_{Sch})$$

The stride length SW with a jump phase results from the distance of the foot FA (without consideration of the position of the angle of the stretch from FA to the ground 14), in addition with the path section which is passed in the jump phase, therefore in the time $t_O$. Consequently there results the nearly precise length of the step:

$$SW = FA + t_o \cdot v = FA + t_o \frac{SW}{t_{Sch}}$$

and as a result of recalculation:

$$SW = \frac{FA}{1 - \frac{t_o}{t_{Sch}}}$$

From this it is apparent that during running without a jump phase, since $t_O=0$, stride length SW is equal to the foot distance FA. For an even more precise calculation, the angular position of the stretch from FA to the ground 14 may also be taken into consideration as a constant. Correspondingly, the measured step time $2t_{Sch}$ (cut in half from the time span $S2-S2'$) must be included into the calculation. The received and/or determined values, such as length of the step SW, distance between the feet FA, the total stretch covered, the total time and any given intermediate results may be delivered by the microcomputer 23 depending on the feed in of the program as signal codes and/or, for example, may be fed to a display or to an indicator 24.

Figure 5:
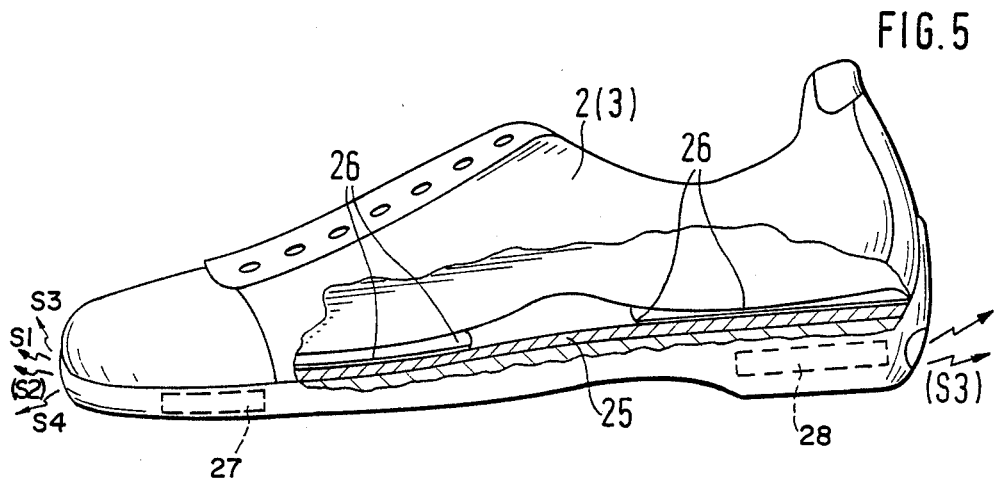

According to a further development of the invention shown in FIG. 5, on the inside sole 25 of each shoe 2, 3, a junction electrode 26 is provided in the area of the heel and/or in the area of the front of the foot. This electrode is always connected or electrically coupled with the output electrode of a first or second transmitter 8 or 16 radiating an electromagnetic emission in the wavelength area up to a few GHz. In this way, the body of the runner is used as an uncoupling member, for example, as an antenna. As a result of that, it will be possible to use transmitters which have a very small output power yet proper functioning of the arrangements will be ensured. Moreover, disturbances between persons running close to one another are practically impossible.

As a result of the fact that the length of every stride is available in the form of a precisely measured value, it will be possible as a result of the evaluation arrangement 23 to determine the length of the path run, the momentary and average speed. Furthermore, it will also be possible to determine and to record, values which can be derived from this data, for example, consumption of calories. It is also possible to provide storages in the evaluation arrangement 23 for storing of the received signals and/or of the intermediate and/or end results obtained for subsequent review and evaluation.

The system according to the invention is used particularly advantageously when athletic shoes for running disciplines are provided with a sensor in the shoe sole which sensor emits a signal when the shoe is put down or lifted up, and a transmitter which delivers a radiation corresponding to the signal which is received by a receiver that is not tied to a certain place according to the initially mentioned patent application of the present assignee. There, the arrangement is made such that a receiver or a transmitting receiver is provided in a shoe which receives the radiation emitted by the other shoe of the runner. By way of an assigned calculator, one may determine from the signal issued by the transmitter or from the corresponding radiation and from the radiation received by the receiver, the distance of the two shoes and thus the length of the stride in the case of or shortly after the stepping down of the shoe provided with the transmitter. The process described in relation to FIG. 6 of this prior application has been characterized by the fact that, when the forward shoe hits the ground, the transmitter of this shoe emits a starting signal and radiates it in such a way that it may be received by a receiver provided on the athlete's body as well as by the receiver of the trailing shoe. The reception of the starting signals by the receiver in the trailing shoe caused the transmitter provided in the trailing shoe, on its part, to send a starting signal in such a way that it may be received directly by the receiver provided on the athlete's body or by way of the forward shoe as a relay station. From the two starting signals shifted timewise and received by the receiver carried on the body, the speed of the legs or of the running and/or the length of the stride of the athlete is determined by way of a calculator assigned to the receiver and is issued by way of an optical recording and/or by way of an acoustic converter.

Likewise, construction of the sole with one or more receiving spaces, such as 27 or 28 in FIG. 5, for the components of the arrangements 1 and/or 4 can also be produced in accordance with the disclosure of Ser. No. 701,194, now U.S. Pat. No. 4,703,445. However, it is noted that, as shown by the arrows in FIG. 5, signal S3 should be transmitted from the heel while signals S1, S2, and S4 should be transmitted, preferably, from the toe area of the shoe for proper reception. Furthermore, the sensor 11 for receiving signal S3 should be located in the shoe tip or frontal shoe area, or if it is interiorly located it should be inclined in a forward direction.

While we have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

What is claimed is:

1. System for the determination of movement characteristics in running disciplines, such as strides length, running speed or the like, with shoes, especially athletic shoes, comprising:
   (a) first and second shoes;
   (b) first sensor means, in said first shoe, for responding to lifting off of the first shoe from the ground;

(c) second sensor means, in said second shoe, for responding to contacting of the second shoe with the ground;
(d) first transmitter means, in said first shoe, for radiating a first signal, said first transmitter means being triggerable by a response from the first sensor means;
(e) second transmitter means, in said second shoe, for radiating second and third signals, said second transmitter means being triggerable as a result of a response from the second sensor means;
(f) first receiver means, in said first shoe, for receiving the third signal and for causing said first transmitter means to radiate a fourth signal in response to receipt of said third signal;
(g) an evaluating arrangement that is operable for determining the movement characteristics of a user wearing the shoes based upon the first, second and fourth signals according to signal timing and origin; and
(h) second receiver means, positionally spaced from said shoes, and for receiving the first, second and fourth signals, differentiating these signals and, after differentiation, feeding these signals to said evaluating arrangement.

2. System as in claim 1, wherein the first transmitter means comprises a high frequency transmitter, the second transmitter means comprises a high frequency transmitter and an ultrasound transmitter, the first receiver means comprises an ultrasound receiver, and the second receiver means comprises a high frequency receiver.

3. System as in claim 2, wherein high frequency signals, namely the first signal, the third signal and the fourth signal, are emitted by the high frequency transmitters as impulses with an impulse length differing one from the other.

4. System as in claim 3, wherein a time measuring means is provided for determining a stepping time from the temporal distance of the first signal from the immediately succeeding second signal, and a foot distance from a running time between receipt of the second signal and the fourth signal at the second receiver means.

5. System as in claim 4, wherein the evaluating arrangement comprises means for determining the length of a stride taken by the user (SW) from the step time ($t_{Sch}$), the jump time ($t_0$) and the foot distance (FA) according to the formula:

$$SW = \frac{FA}{1 - \frac{t_o}{t_{Sch}}}$$

6. System as in claim 5, wherein the evaluating arrangement is a microcomputer.

7. System as in claim 6, comprising means for displaying data determined by said evaluating arrangement.

8. System as in claim 7, wherein the evaluating arrangement is operable for determining the cumulative total of the lengths of all strides taken by the user along a path.

9. System as in claim 8, wherein the evaluating arrangement is provided with means for the storing of data.

10. System as in claim 5, wherein, in each of the shoes, at least one junction electrode is provided on the insole that is connected to a respective transmitter output in a manner for enabling the body of the user to serve as a means for radiating signals produced by the respective transmitter.

11. System as in claim 3, wherein, in each of the shoes, at least one junction electrode is provided on the insole that is connected to a respective transmitter output in a manner for enabling the body of the user to serve as a means for radiating signals produced by the respective transmitter.

12. System as in claim 1, wherein a time measuring means is provided for determining a stepping time from the temporal distance of the first signal from the immediately succeeding second signal, and a foot distance from a running time between receipt of the second signal and the fourth signal at the second receiver means.

13. System as in claim 12, wherein the evaluating arrangement comprises means for determining the length of a stride taken by the user (SW) from the step time ($t_{Sch}$), the jump time ($t_O$) and the foot distance (FA) according to the formula:

$$SW = \frac{FA}{1 - \frac{t_o}{t_{Sch}}}$$

14. System as in claim 13, wherein the evaluating arrangement is a microcomputer.

15. System as in claim 14, comprising means for displaying data determined by said evaluating arrangement.

16. System as in claim 12, wherein the evaluating arrangement is a microcomputer.

17. System as in claim 16, comprising means for displaying data determined by said evaluating arrangement.

18. System as in claim 12, wherein the evaluating arrangement is operable for determining the cummulative total of the lengths of all strides taken by the user along a path.

19. System as in claim 12, wherein the evaluating arrangement is provided with means for the storing of data.

20. System as in claim 1, wherein, in each of the shoes, at least one junction electrode is provided on the insole that is connected to a respective transmitter output in a manner for enabling the body of the user to serve as a means for radiating signals produced by the respective transmitter.

* * * * *